(12) United States Patent  
Stallard

(10) Patent No.: US 9,672,014 B2
(45) Date of Patent: *Jun. 6, 2017

(54) TRANSPARENT NETWORK SUBSTRATE SYSTEM

(71) Applicant: Aerial Robotics, Inc., Richmond, UT (US)

(72) Inventor: Kevin Stallard, Richmond, UT (US)

(73) Assignee: Aerial Robotics, Inc., Palisade, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/853,820

(22) Filed: Sep. 14, 2015

(65) Prior Publication Data

US 2016/0077813 A1    Mar. 17, 2016

Related U.S. Application Data

(63) Continuation of application No. 13/514,329, filed as application No. PCT/US2010/003165 on Dec. 13, 2010, now Pat. No. 9,135,055.

(Continued)

(51) Int. Cl.
*G06F 15/16* (2006.01)
*G06F 9/44* (2006.01)
(Continued)

(52) U.S. Cl.
CPC ............... *G06F 8/37* (2013.01); *G06F 9/465* (2013.01); *G06F 9/54* (2013.01); *G06F 9/547* (2013.01);
(Continued)

(58) Field of Classification Search
CPC .. H04L 41/0246–41/0293; H04L 67/40; G06F 9/547
See application file for complete search history.

(56) References Cited

U.S. PATENT DOCUMENTS 5,649,204 A * 7/1997 Pickett .................. G06F 8/71
717/167
2002/0059470 A1 5/2002 Allard et al.
(Continued)

OTHER PUBLICATIONS

International Search Report for PCT/US2010003165, issued Aug. 31, 2011.
(Continued)

*Primary Examiner* — Brendan Higa
(74) *Attorney, Agent, or Firm* — Holland & Hart LLP

(57) ABSTRACT

A transparent network substrate system including at least one server module and at least one client module. The server module provides a selected functionality, such as moving an actuator, performing a mathematical operation, and receiving data from a sensor. Upon execution the server module's machine code writes information necessary to describe the selected functionality to memory. The information written to memory includes information necessary to invoke the server module functionality and may include types, members, and parameters. The client module searches the memory for the selected functionality; requests information from the server module; and invokes the functionality of the server module. Once invoked by the client the server module uses the information in memory for creating dynamic function calls.

12 Claims, 11 Drawing Sheets

Related U.S. Application Data

(60) Provisional application No. 61/285,905, filed on Dec. 11, 2009.

(51) Int. Cl.
  *H04L 29/06* (2006.01)
  *G06F 9/54* (2006.01)
  *G06F 9/46* (2006.01)

(52) U.S. Cl.
  CPC ............ *H04L 67/40* (2013.01); *H04L 67/42* (2013.01); *G06F 2209/541* (2013.01)

(56) References Cited

U.S. PATENT DOCUMENTS

| | | | |
|---|---|---|---|
| 2002/0073246 A1* | 6/2002 | Pickett | G06F 9/445 719/332 |
| 2002/0184618 A1* | 12/2002 | Bala | G06F 9/45516 717/148 |
| 2003/0163450 A1 | 8/2003 | Borenstein et al. | |
| 2003/0223582 A1 | 12/2003 | Dagan | |
| 2004/0117375 A1* | 6/2004 | Saha | G06F 13/28 |
| 2004/0117759 A1 | 6/2004 | Rippert et al. | |
| 2004/0148338 A1 | 7/2004 | Saare et al. | |
| 2005/0193097 A1* | 9/2005 | Guthrie | H04L 67/40 709/219 |
| 2005/0251527 A1 | 11/2005 | Phillips et al. | |
| 2006/0136351 A1 | 6/2006 | Angrish et al. | |
| 2008/0071884 A1 | 3/2008 | Heithcock et al. | |
| 2009/0113402 A1* | 4/2009 | Chen | G06F 8/41 717/140 |

OTHER PUBLICATIONS

Rakjumar, The real-time publisher/subscriber inter-process communication model for distributed real-time systems: design and implementation, The 1st IEEE Real-Time Technology and Applications Symposium Proceedings, May 15-17, 1995, pp. 66-75. (Only Abstract provided).

* cited by examiner

TRANSPARENT NETWORK SUBSTRATE SYSTEM

CROSS-REFERENCE TO RELATED APPLICATIONS

The present application is a continuation of U.S. Patent Publication No. 2012/0323994 filed on Sep. 7, 2012. U.S. Patent Publication No. 2012/0323994 claims the benefit of U.S. Provisional Application No. 61/285,905, filed Dec. 11, 2009, the disclosure of which is hereby incorporated by reference in its entirety.

COMPUTER PROGRAM LISTING APPENDIX

A computer program listing appendix was submitted with U.S. Patent Publication No. 2012/0323994 filed on Sep. 7, 2012 on a compact disc. The material on the compact disc is hereby incorporated by reference in its entirety.

The disc includes TNSmacros.hpp, created Dec. 10, 2010, filed size 28 kb. The above incorporated computer program listing appendix is referred to herein as APPENDIX A.

BACKGROUND

Getting separate executing entities (processes) to interact with each other is a desirable trait of complex distributed systems. It allows separately executing entities to take advantage of each other's functionality without specifically including that functionality within the entity.

There are several technologies that currently exist that provide this kind of cross-process communication. Microsoft has COM (Component Object Model) and DCOM (Distributed Component Object Model), UNIX systems have CORBA (Common Object Request Broker Architecture). These systems indeed provide this cross binary/process/executable resource access, however, they are complex in that there are numerous details that need to be addressed by a developer using these technologies. This makes use of these features difficult and when installed on systems, require a lot of maintenance, and are fragile (they don't always work correctly) as they require numerous files and configuration settings to exist and be correct. A corrupt hard disk or the accidental erasure of only one of these files can bring a system to a halt.

Newer computer languages have simplified this process. However these newer languages most often found on a narrow range of operating system platforms (Microsoft Windows, for example) and are not available on real-time and safety critical systems. Furthermore, these languages provide difficulty for developers of safety critical systems as they will sometimes perform operations and exhibit behavior that is incompatible with the validation requirements for such systems. For example, some languages perform automatic (and sometimes unpredictable and unbounded) operations that have not been specifically requested by the programmer. While these are considered useful in insuring reliability of general purpose applications, they may be detrimental to specialized systems. Garbage collection is one example, this is where a programs execution is interrupted while memory that is deemed unused is returned to the pool of usable memory. This operation is considered useful for general purpose systems, but because of its unpredictability in terms of when it is run and how long it takes, is problematic in real-time systems. These newer computer languages still require complex installations and numerous files and configuration settings that make the system vulnerable to unexplained failure.

Successfully implementing a system based on COM/DCOM or CORBA requires static and rigid interfaces to exported functionality. If access to an exposed interface is attempted without the correct understanding of its structure, errors will occur in which the functionality behind the exposed interface usually will halt operation completely, and sometimes catastrophically. These interface definitions exist separately from the executable. If these interface definitions become corrupted or if they do not match the executable, then the system will fail in unexpected ways.

COM/DCOM and CORBA have to use an additional compilation step to correctly expose interfaces contained within, for example, a C/C++ program. Building C/C++ programs requires two steps known as the pre-processor step (preparing the code for the compiler) and the compiler step (conversion of C/C++ code into machine language). Both of these operations are performed by the compiler executable itself. If COM/DCOM or CORBA need to be used, a separate file containing the desired exposed interface called an interface definition language (IDL) must be prepared and run through a separate compiler that understands this IDL. The IDL compiler step results in a file that is separate from the binary containing descriptive information about the interface as well as other artifacts. These are not included with the binary and therefore are vulnerable to becoming out of sync with the binary.

SUMMARY

Transparent Network Substrate (TNS) is a system that forgoes much of the complexity of the above described systems. TNS is able to:

1. Give separate executing entities access to each other's resources without the overhead of a separately installed subsystem.
2. Is able to provide this access over many networking topologies and communication technologies seamlessly.
3. Does not perform background operations that may impact validation and realtime determinism. All the operations of a TNS system are predictable and deterministic.
4. Allows cross executable sharing of resources on a wider range of operating systems and platforms.
5. Interface definitions are created dynamically, and are part of the executable, this removes the chance of it getting corrupted or out of sync with currently installed software. Instead of having to install a number of files and configuration settings, only one executable is needed to run on the target system.
6. Executable entities (clients) that require functionality from TNS enabled executable entities (servers) can learn the server's interface at run-time from the server process. This opens the door for intelligent interface discovery and increases a system's potential for truly dynamic self-behavior modification.
7. Clients can dynamically decide if the interface is callable or make adjustments to the data sent to match the interface.
8. No other files are required, only the binary containing the executable code is required. No other 'layers' of software need to be installed on the computer using TNS.

9. Developers can use native compilers, such as C/C++, and are not locked into a vendor specific set of complex tools and complex functionality.

All of the known mechanisms on the market today, require much infrastructure in order to have separately executing units communicate and use each other's functionality. TNS provides several benefits not found in current state of the art systems. They are:

1. Combines all necessary functionality into a single binary
2. Eliminates extensive system configuration requirements
3. Eliminates the need for any additional tools needed during the build and development process. A modern compiler, such as a C/C++ compiler, is all that is needed.
4. Developer does not have to take into consideration that their functionality may be used with TNS.
5. TNS provides the compiler specific source code necessary for the compiler to generate source code and the machine code necessary to perform the complex operations needed to make remote functionality invocation possible.
6. Eliminates the need that every detail of the interface structure be known before a client attempts to communicate with a server.
7. Eliminates the need that the interface be an immutable (unchangeable) contract between client and server via interface conflict resolution.
8. Provides developers, using a wider range of operating systems and who are developing for systems with limited resources, a tool to allow implementation of a distributed system with low overhead in terms of needed processing power and non-volatile storage.

In one embodiment the TNS system is implemented on a non-transitory machine readable storage medium that includes machine code for instructing a microprocessor. The machine code may include at least one server module and at least one client module.

The server module includes server machine code that provides a selected functionality, such as moving an actuator, performing a mathematical operation, receiving data from a sensor, and combinations thereof. Upon execution the server machine code writes information necessary to describe the selected functionality to a memory device. The information written to memory includes information necessary to invoke the server module functionality and may include types, members, and parameters. The server machine code uses the information in memory for creating dynamic function calls.

The client module includes client machine code that searches the memory for the server providing the selected functionality; requests information from the server module about the functionality; and invokes the functionality of the server module. The client module includes interface query functionality including client machine code for retrieving types; retrieving all of the members for each type; and retrieving all of the parameters for each member.

The client module includes data marshalling functionality that determines if the parameters are fixed or variable in length and captures the length of parameters that are determined to be variable in length. A parameter may be accompanied by a data length parameter and the client module is operative to store an address of the parameter and the data length parameter in an input output vector.

The server machine code may be generated by a compiler running on a microprocessor from server source code. The server source code includes source code for generating the server machine code that provides the selected functionality. The server source code also includes code for generating server machine code representative of the information and for generating server machine code that is operative to write the machine code representative of the information to the memory device.

The compiler includes a preprocessor and at least a portion of the server source code may be created by the preprocessor. The preprocessor uses source code in the form of a macro to create the portion of said server source code. At least a portion of the server source code may be created by the compiler.

DETAILED DESCRIPTION

System Structure

The TNS system is realized in two main parts. The executable that exposes functionality (i.e. the ability to move an actuator, do a complex mathematical operation, or retrieve data from a sensor) is called a TNS enabled server, also referred to herein as a TNS server, server, or server module. The executable that uses functionality of a TNS Server is called a TNS enabled client, also referred to herein as a TNS client, client, or client module. The term server as used herein refers to a computer program running as a service, to serve the needs or requests of other programs (referred to in this context as "clients") which may or may not be running on the same computer. While the exemplary embodiments are described with respect to C/C++, it is contemplated that other suitable programming languages may be used to implement the TNS system described herein.

Figure 1:
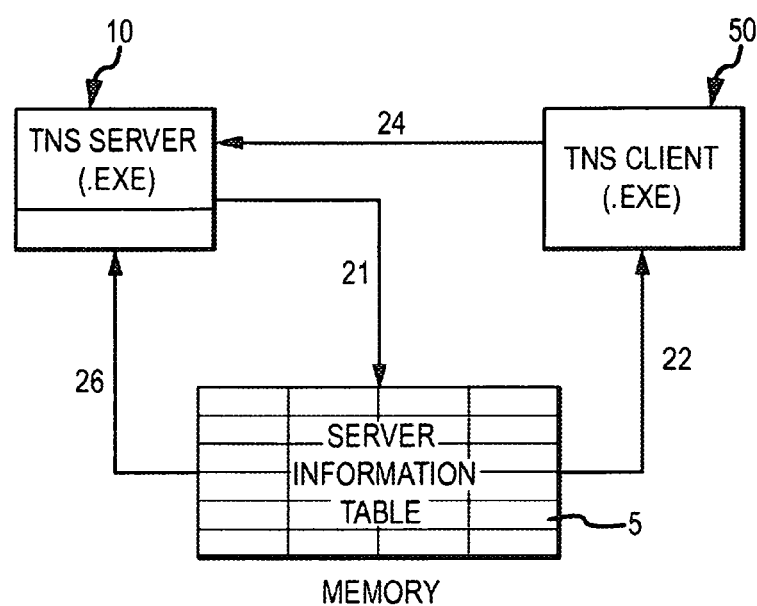
FIG. 1 is a high level schematic representation of the TNS system architecture.

Referring first to FIG. 1, the TNS system broadly includes a TNS server 10 and a TNS client 50. As explained more fully below, upon execution the TNS server writes 21 information about itself to memory 5. The client 50 retrieves 22 the information in memory 5 in order to find the server and its functionality as well as communicate with the server 10. Using the information, the client 50 can send 24 a message to the server 10 in order to invoke functionality of the server. Once the server 10 receives a message from the client the server 10 retrieves 26 the information in memory 5 in order to create dynamic function calls.

Figure 2:
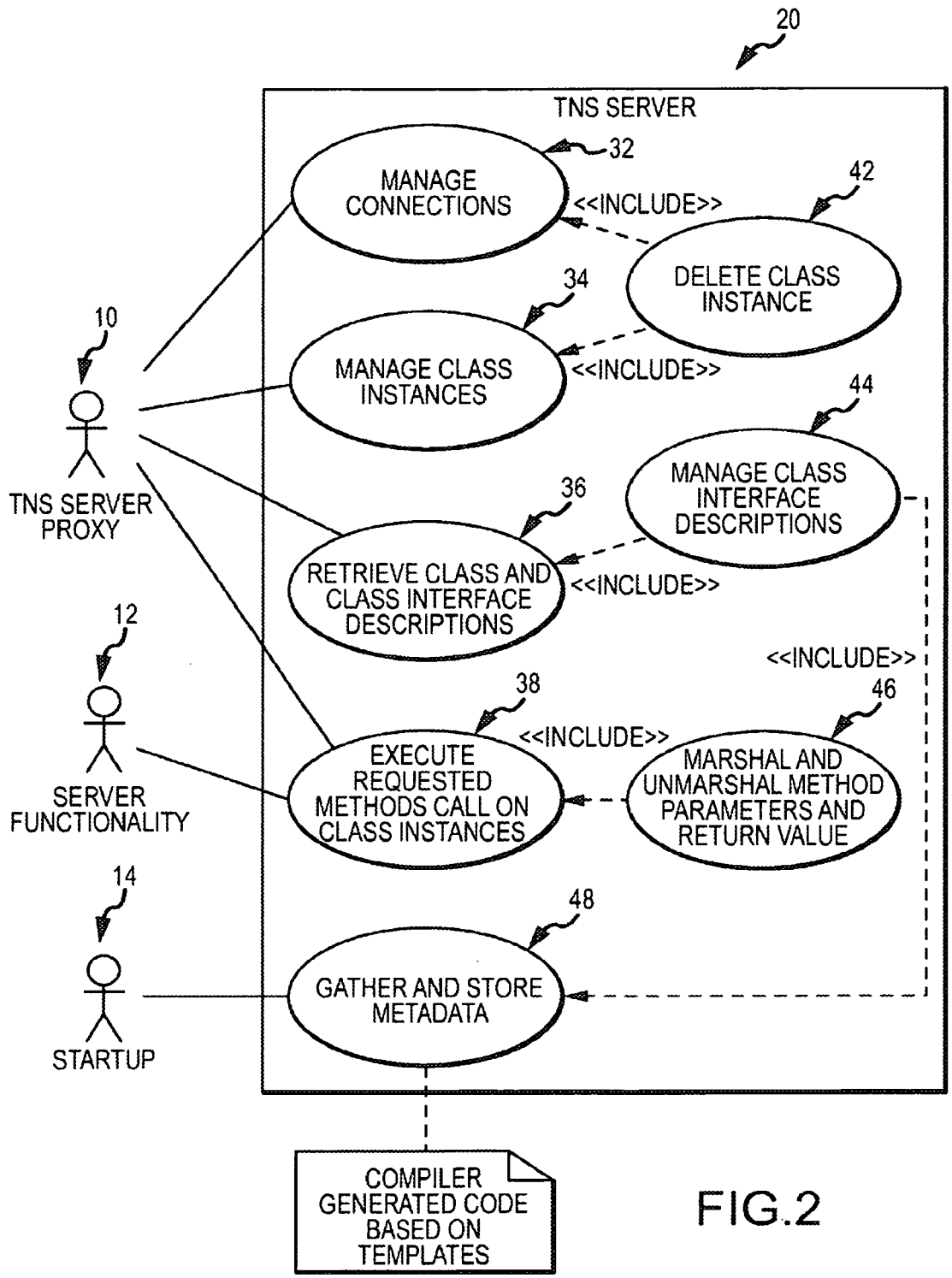
FIG. 2 is a diagram illustrating the responsibility boundaries assigned to TNS Servers as well as the functionality it uses to respond to TNS Client requests and properly manage communication with TNS Clients.

FIG. 2 broadly enumerates the TNS Server 10 process and the fundamental functionality needed to manage connections with TNS Clients. This functionality is in the form of a TNS server stub 20 that includes manage connections functionality 32, manage class instances functionality 34, retrieve class and class interface descriptions 36, and execute requested method calls on class instances 38. The manage connections functionality 32 keeps track of the entities (clients) that are requesting the server's functionality 12. It allows the enforcement of security and access policies as well as provide for data encryption for secure links. The manage connections functionality 32 includes a delete class instance routine 42, which is used to delete the instances of functionality created and used by the client when it disconnects. These instances are sometimes referred to as 'class instances'. Server 10 also includes manage class interface descriptions 44 which allow the compiler generated code in gather and store metadata 48 to record the information gathered at startup 14. It also provides means for retrieve class and class interface descriptions 36 to retrieve the information it sends to a requestor (i.e. a TNS Client).

Figure 3:
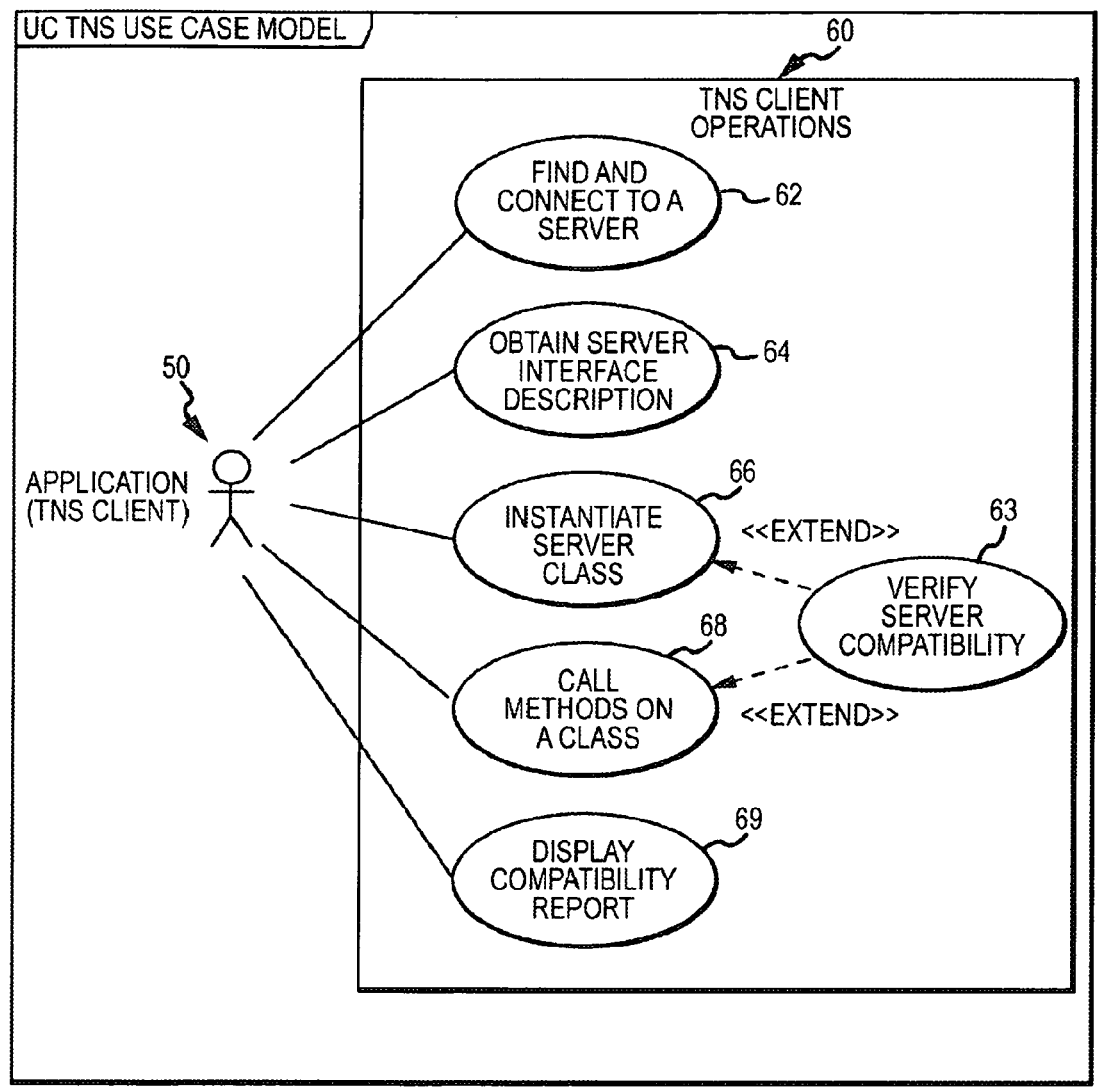
FIG. 3 is a diagram illustrating the responsibility boundaries assigned to TNS Clients as well as the functionality TNS Clients use to properly communicate with TNS Servers.

FIG. 3 illustrates a TNS Client 50 and the functionality it contains to connect to and use a TNS Server 10. This functionality is in the form of a TNS Client Stub 60 that includes find and connect to a server 62, obtain server interface descriptions 64, instantiate server class 66, verify server compatibility 63, call methods on a class 68, and display compatibility report 69.

Figure 4:
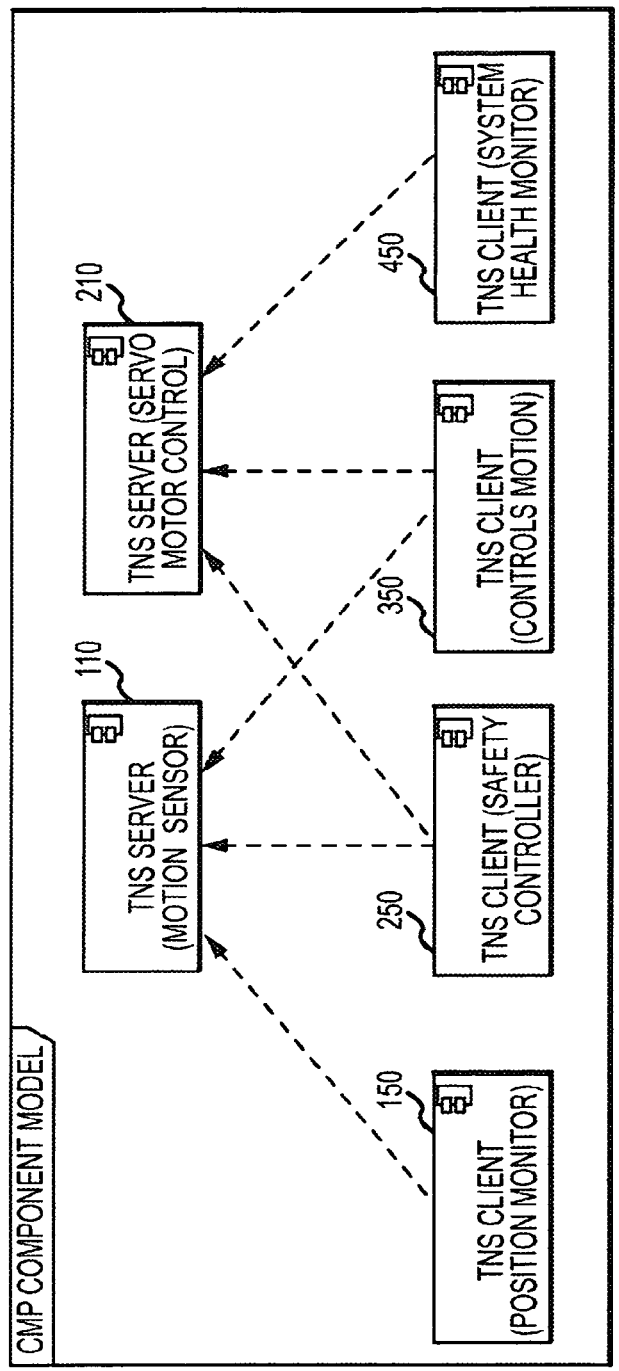
FIG. 4 is a diagram depicting an exemplary TNS system in one way it might be used.

FIG. 4 illustrates an example of a distributed system using TNS. The example includes two TNS enabled servers 110 and 210. In this example, TNS server 110 contains the necessary functionality to read a sensor (not shown) that detects rotational motion and TNS server 210 contains the necessary functionality to control a servo (not shown). TNS clients 150, 250, 350, and 450 are each connected to one or more of the TNS servers. Each client has specialized functions they can perform and either need data from the motion sensor or need to control the server or both. Referring again to FIG. 3, the clients connect to the TNS servers using the find and connect to a server functionality 62, retrieve the server's functionality interface using obtain server interface description functionality 64, create instances of functionality on the server through instantiate functionality 66 and verify compatibility functionality 63, and call specific functionality on those instances using call methods on a class functionality 68. If there are mismatches between what the client is expecting to use and what the server provides (in terms of an interface) this information is displayed or reported using display compatibility report functionality 69.

Metadata Gathering

In a C++ implementation of TNS, TNS exposes or exports functionality of a TNS Server to TNS Clients by using compiler primitives (aka macros) and templates. These macros and templates gather information or insert code that gathers reflection/metadata information at runtime. When the compiler processes the TNS Server source code, the following occurs:

1. Templates are translated into instructions that allow the classes to be instantiated and methods called conditionally. In C++ these are commonly known as 'funktors'.

2. Creates code that perform the following functions:
   2.1. Capture the names of the classes (if any), names of methods and functions, and names of the data-types and parameters.
   2.2. Parse parameter lists and mark parameters intended for data length specification of variable length data. Associate the data length parameter with the parameter containing the variable length data.
   2.3. Store captured data types and symbol names into an in memory database.
   2.4. Cause the instantiated template classes to form an array of data types. This array uses an abstract base class, the template classes are derived from that abstract base class. This allows the types to be stored into an array and allows type specific operations to occur (i.e. creating a class or invoke a method).

Figure 5:
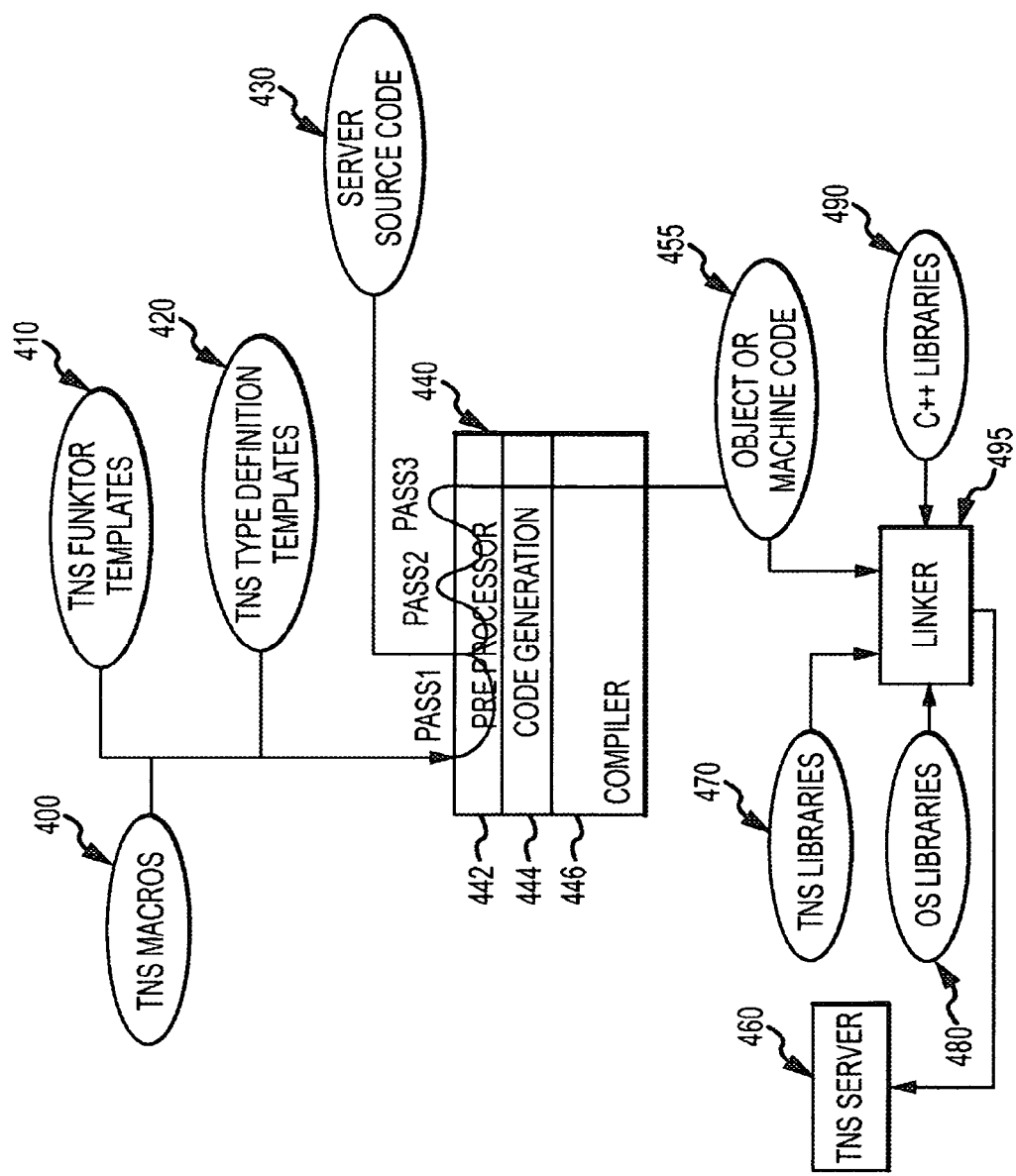
FIG. 5 is a diagram illustrating the steps the compiler takes in building a TNS enabled executable.

FIG. 5 illustrates what occurs when a compiler processes the TNS Server source code 430 in an exemplary C++ implementation. Compiler 440 is comprised of three parts, a preprocessor 442, a code generator 444, and a code compiler 446. The compiler 440 reads the code from several reference files in order to resolve the instructions found in server source code 430. Server source code 430 includes a file or files that define the server behavior that is to be exported (i.e. servo motor control routines). The reference files include a header file containing macro definitions 400, a header file containing C++ template definitions 410 that provide means for creating, storing and accessing C++ funktors, and a header file containing template definitions for creating, storing and accessing data type definitions 420.

The compiler 440 resolves the server source code in three pre-processor passes. The first pass translates macro statements 400 to the necessary corresponding TNS code that will create the metadata discussed earlier. Once this substitution has completed, the second pass is the code generation where template code is instantiated as needed. In the third pass the code is passed into the compiler stage 446 where the object or machine code 455 is generated.

Machine code 455 is fed into the linker 495 which combines the machine code 455 with several other support libraries or archives, such as TNS library 470, OS support libraries 480, and libraries to support the C++ language 490. When the linker 495 is finished, it outputs the TNS enabled server executable 460.

The following is an example TNS exportation of a C++ class and its members (definition portion of source code 430). Included in Appendix A are the TNS macros needed to compile this example class.

```
#ifndef __EXAMPLE_H
#include <wchar.h>
#include <iostream>
#include <errno.h>
#include <stdint.h>
#include "TNS.hpp"
#include "TNSSymbolDef.hpp"
#include "TNSTypeDef.hpp"
#include "TNSMacros.hpp"
    TNS_BEGIN_CLASS_DERIVE( Example, ExampleBase )
        TNS_CONSTRUCTOR( Example( ) )
        TNS_CONSTRUCTOR( Example( const char *Name ) )
        TNS_DESTRUCTOR( ~Example( ) )
        TNS_STATIC_METHOD(GetMainExample,Example *GetMainExample( ) )
        TNS_STATIC_METHOD(SetMainExample, void SetMainExample( Example *widget ) )
        TNS_METHOD( Add, int Add( Example *widget ) )
        TNS_METHOD( Remove, int Remove( Example *widget) )
        TNS_METHOD( AddVarLenData, int AddVarLenData( char
```

-continued

```
*name, char *data, int datalen ))
        TNS_METHOD( AddString, int AddString( char *name, char
*string ))
        TNS_METHOD( GetVarLenData, int GetVarLenData( char
*name, char *data, int &datalen))
        TNS_METHOD( GetString, int GetString( char *name, char
*string, int &stringlen))
        TNS_METHOD( ToFront, int ToFront( ) )
        TNS_METHOD( ToBack, int ToBack( ) )
        TNS_METHOD( GetParent, Example *GetParent( ) )
        TNS_STARTUPMETHOD( )
        TNS_SHUTDOWNMETHOD( )
        TNS_END_CLASS( PhWidget );
#if !defined __EXAMPLE_H_PASS
#define __EXAMPLE_H_PASS 1
#include "Example.hpp"
#elif defined __EXAMPLE_H_PASS &&__EXAMPLE_H_PASS == 1
    #undef __EXAMPLE_H_PASS
    #define __EXAMPLE_H_PASS
    #include "Example.hpp"
#elif __EXAMPLE_H_PASS == 2
    #undef __EXAMPLE_H_PASS
    #define __EXAMPLE_H_PASS 3
    #include "Example.hpp"
#elif __EXAMPLE_H_PASS == 3
    #undef __EXAMPLE_H_PASS
    #define __EXAMPLE_H
#endif /*CLASSDEF_HPP_*/
#endif //__PTWIDGET_H__
```

First is the class declaration using the TNS macro TNS_BEGIN_CLASS_DERIVE( ). This macro indicates that the C++ class being exported is derived from a base class. The next item is the class constructor. In C++, the type footprint of a constructor differs from that of a class method, so TNS provides a distinct macro for constructors. The same applies to destructors. Then there are the class methods. C++ can have static (global) class methods and it can have normal class methods; TNS accounts for both. At the end of the above example file, there are a number of preprocessor conditionals. These allow the class definition file (header file) to have multiple passes made by the C++ preprocessor 442 before it enters the compiler stage 446. This allows macros to be redefined in ways that are needed to capture the information contained as macro parameters.

Optionally, a TNS enabled client that has foreknowledge of the methods it will invoke uses the TNS compiler instructions to do the same things as it does for the server on the methods it will call on the server (i.e. create an in-memory database of the types it will be using to interact with the server). However, a TNS Client need not know before hand (when it is compiled and built) what functionality a server contains. It can enumerate the functionality of the server and invoke whatever functionality it wishes.

The metadata is used to:
1. Arbitrate interfaces
2. Instantiate classes
3. Call methods and obtain return values When the server binary starts up, the compiler has inserted the code necessary to gather metadata and type information of the exported interfaces. This code gathers and stores the following information:
1. Functions, classes, and methods that were marked for export by the developer
2. Information is gathered by the compiler in combination with the compiler generated code to fully describe each of the exported symbols and their type specifications. The information gathered includes:
    a. The name of the symbol
    b. Its type.
        i. This is not just the name, but also the compiler generates code that is capable of creating the type upon a request at runtime.
        ii. In the C++ case, this is done using C++ template code and funktors.
    c. Type traits
        i. A set of variables that are filled with information about the various characteristics of the type. These include:
            1. Byte Alignment
            2. If it is an array, the number of dimensions
            3. If it is a function or method, the number of arguments
            4. Whether or not it has an assignment or if it needs an actual overloaded operator.
            5. Is it an integral or floating point type?
            6. Is it an array?
            7. Is it a class or an aggregate type (a type from the combination of other types).
            8. Has it been labeled as a constant type
            9. Is it a compound type (i.e. a pointer or reference, etc)
            10. Is it an empty type
            11. Is t an enumeration
            12. Is it a floating point
            13. Is it a fundamental type (i.e. POD (plain old datatype).
            14. Is the type a function prototype
            15. Is it an integer
            16. Is it a function/member function pointer
            17. Is it a pointer to a class object
            18. Is it a pointer to a member of a class
            19. Is the type a constructor or a class
            20. Is the data type a "plain old data" structure
            21. Is the type a pointer
            22. Is the type polymorphic
            23. Is it a scalar type
            24. Is Stateless (the object has a trivial constructor and doesn't hold any data)
            25. Is it a reference
            26. Is it a union
            27. Is it a void type
    d. If the symbol is part of an aggregate then the offset from the beginning of the aggregate is recorded
    e. If the symbol is a function, then the arguments to that function are parsed and recorded
        i. If an argument represents the length of an argument that references variable length data, then the name of the argument designating the length of the data is recorded as well as a reference to the argument. This allows the system to associate the data length argument with the argument that will reference the variable length data when communicating with the server.
    f. If a symbol is of an aggregate type or a class, a list of members (symbols and data types) is recorded. This is recursive until sub aggregates are covered.
3. The information gathered is configured to initialize internal structures at startup. When the program using TNS starts up, these data structures are created and initialized with the information gathered at compile time. This allows the server to have access to a database containing all the information necessary to describe how to access server functionality as well as the capability to instantiate classes and invoke methods without the developer having to hand code.

Interface Information Exchange

TNS Clients can use the above functionality if the client is to contain 'hints' as to what the server exposes, however it is not required. TNS Clients have instructions included that query TNS Servers for their exposed interfaces. Thus TNS Clients can be 'dumb' in terms of what a server contains and when it is running can dynamically build a table of what a server provides and can then use it to invoke server functionality.

This is accomplished by using a communication mechanism (the native operating system's Inter Process Communication, TCP/IP, or shared memory—TNS does not specify the communication's mechanism) used by both TNS Servers and TNS Clients to pass information between each other.

Figure 6:
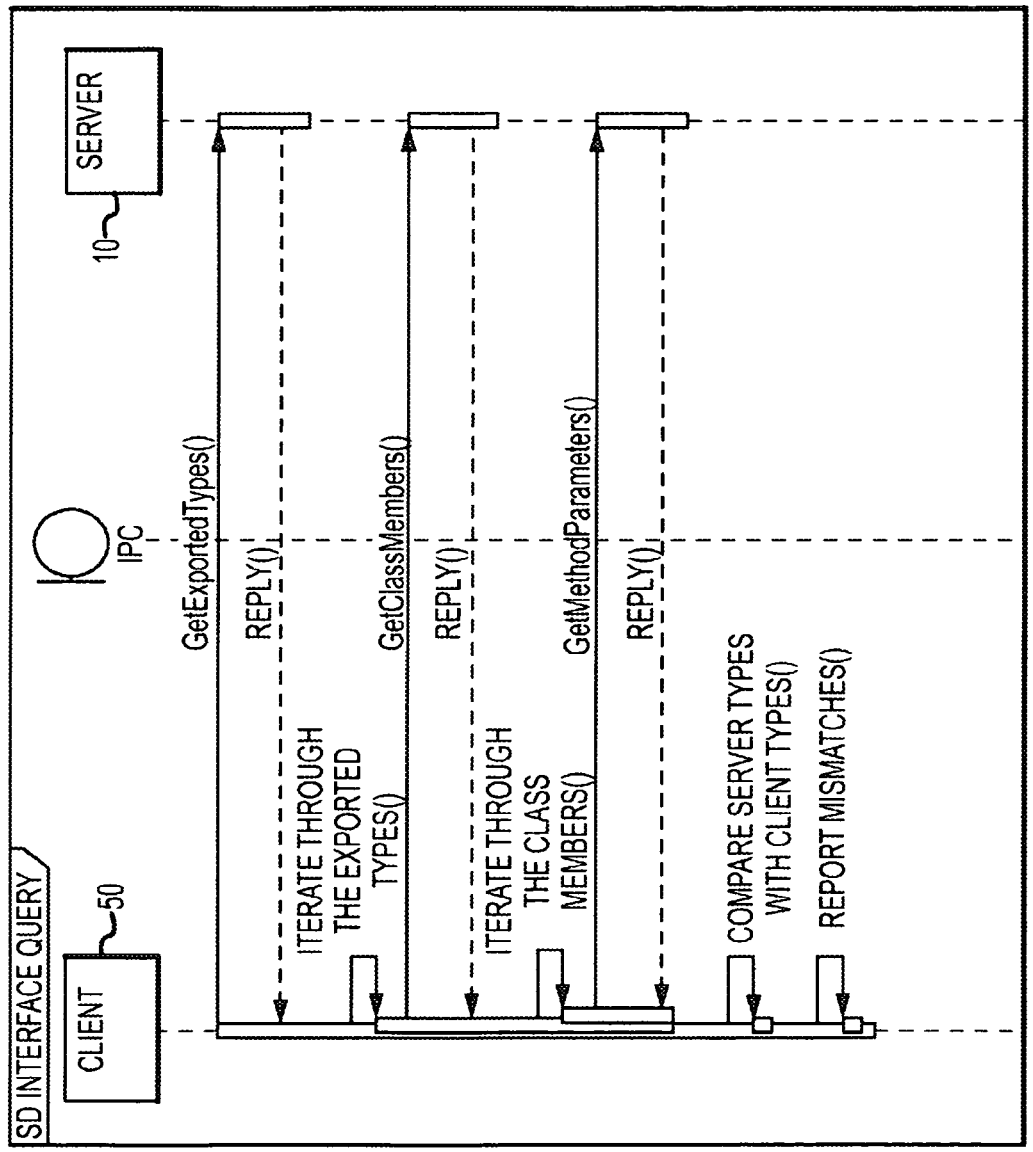
FIG. 6 is a diagram broadly depicting the TNS client interface query functionality.
Figure 7:
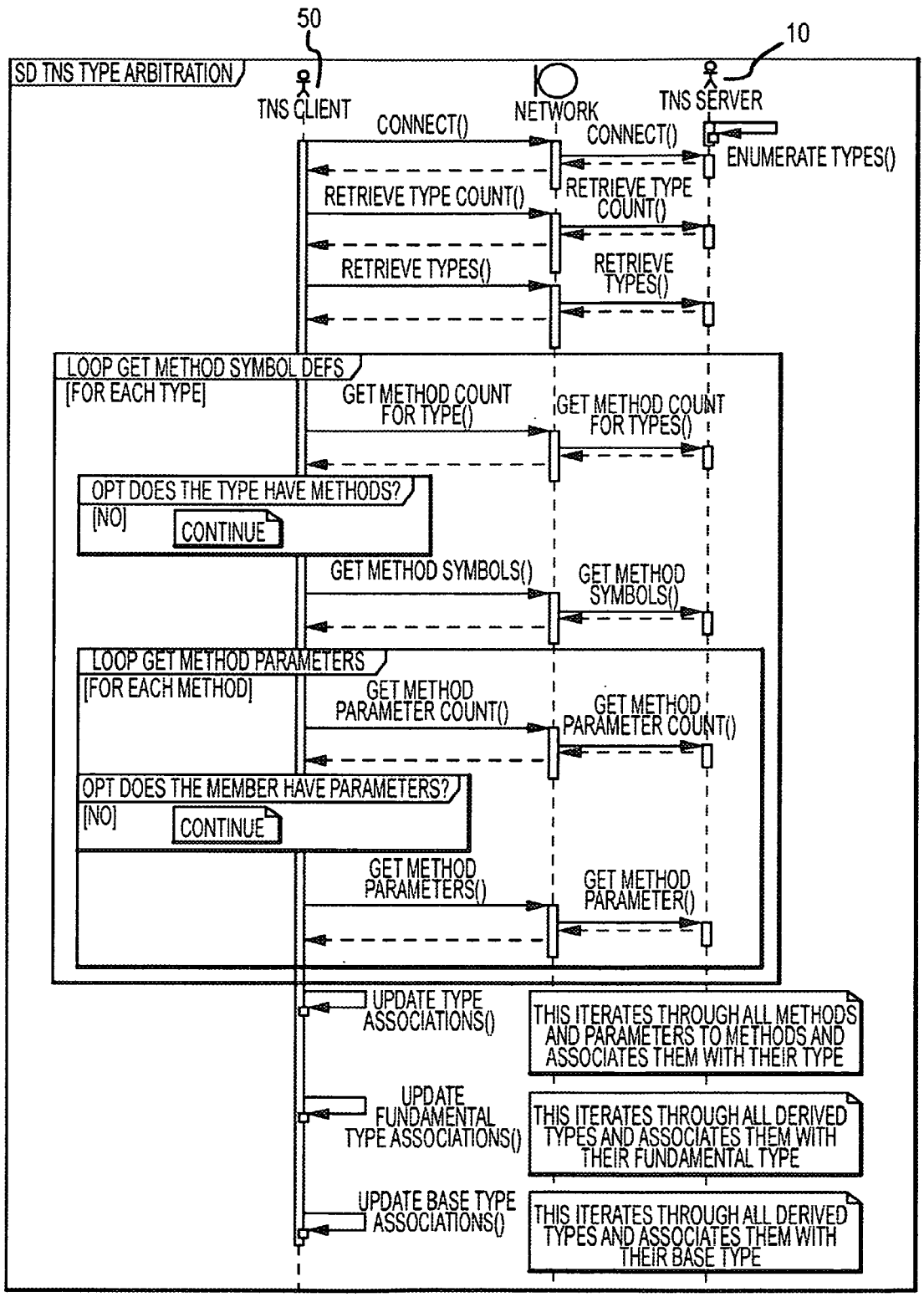
FIG. 7 is a diagram illustrating in more detail the TNS client interface query functionality illustrated in FIG. 6.

The TNS client includes interface query functionality that allows a client to query a server to find out its interface. With reference to FIGS. 6 and 7, there is one immutable interface to TNS enabled servers, and this is to be able to acquire additional interface information. In other words, no matter what server functionality is exported, a TNS enabled server has some functionality that is always there. This is:

1. Get Exported Types
2. Get Class Members
3. Get Method Parameters

These three pieces of functionality allow the server to completely describe the functionality available and how to access it. All the information gathered during metadata gathering is provided to the client. The process for retrieving this information is as follows:

1. The client first uses Get Exported Types to retrieve all the types in the system.
2. It iterates through each of the types and for those that have sub-members (classes and structure or aggregate types) it calls Get Class Members. This retrieves the types and names of the members of the class or structure. It does this recursively.
3. It then iterates through those members and those that are methods, it calls Get Method Parameters to retrieve information on each of the parameters or arguments.

Once the information about the interfaces are retrieved, the client can optionally review those interfaces to make sure the interfaces it is about to call match. If they do not match, the client can make changes in the way it will call the remote interface or report the mismatch. The decision whether or not to use a mismatched interface is not specified by TNS, it is up to the system architect or developer. More information on this conflict resolution is found below under Interface Conflict resolution.

If the client does not know what functions will be called before hand (i.e. if the client is running a script) it uses this information to determine if the request method or class in the script can be called or instantiated at run time. This allows the client to process a script without any preprocessing.

Interface Conflict Resolution

If TNS Clients are built with interface information about a TNS Server, when the TNS Client runs, it will still query the server for this same information. It will then compare its internal references to this interface with the references it retrieved from the server. If these interfaces differ, the TNS Client can try to find a way to resolve those differences and provide a safe way to call the interface. If a resolution cannot be found, the interface is disabled and a warning is generated. As an example, the client may expect a floating point input, but for whatever reason the server it is connected to provides an interface that requires a 16-bit integer. The resolution to such a difference in interface is to convert the floating point to a 16 bit integer. If the client encounters an interface to which no conversion is possible, then the interface is disabled and no attempt to call it is made. These rules are provided by the developer of the client and server functionality. In some systems this would be dangerous and therefore not allowed. Any interfaces differences will disable the client and proper error messages would be displayed.

Interface Invocation and Data Marshaling

Once a TNS Client has retrieved, validated, and resolved an interface to a TNS Server it is ready to invoke functionality on the server. The interface information it now contains is converted into instructions in how to place the data into a data stream that is sent to the server. This is called marshaling. The server is expecting the data in a particular format and subsequently retrieves and validates this data before calling the actual functionality.

The exported function or method called is a normal method and has no knowledge that it is being used in a TNS system. When the function completes, the TNS takes the results and places them into the data stream that is then sent back to the client. The client, because of its knowledge of the interface structure, retrieves the values returned from the method invoked on the TNS Server.

Figure 8:
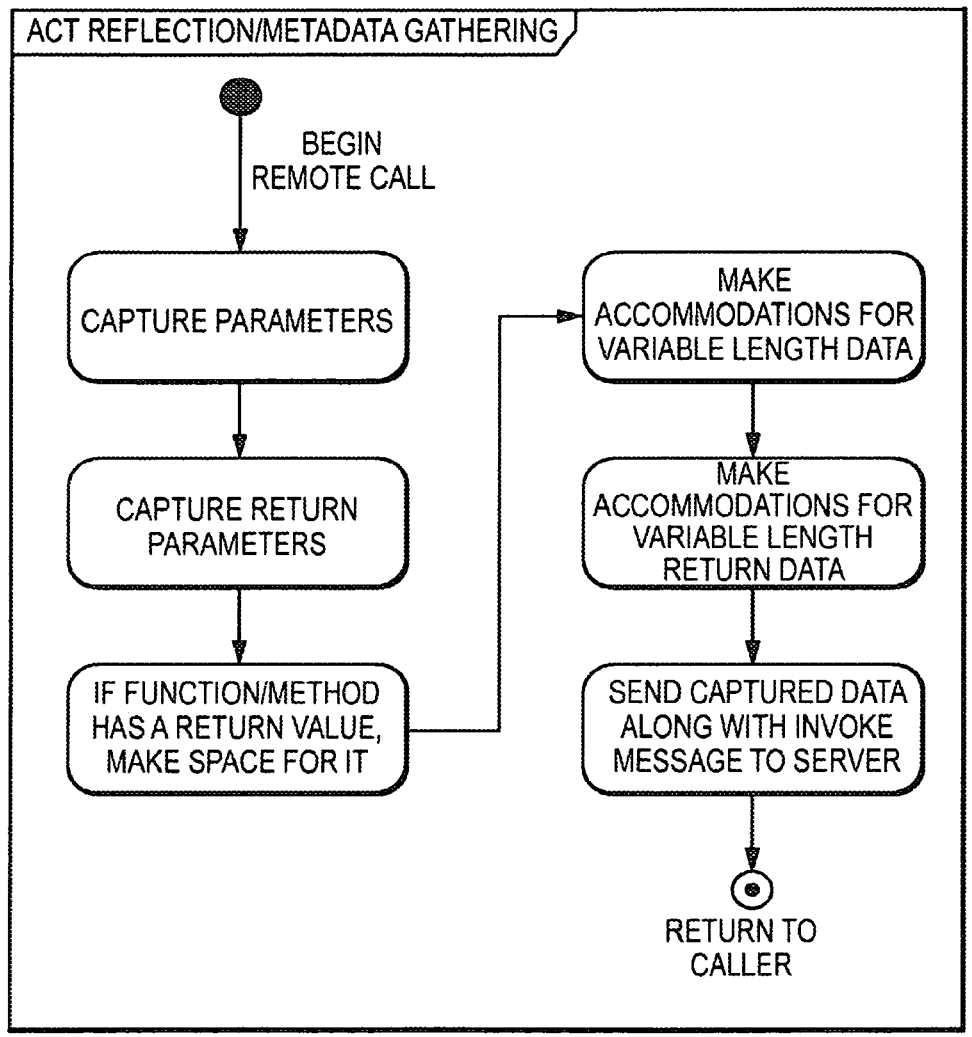
FIG. 8 is a diagram broadly depicting the TNS client to TNS server function invocation process.
Figure 9:
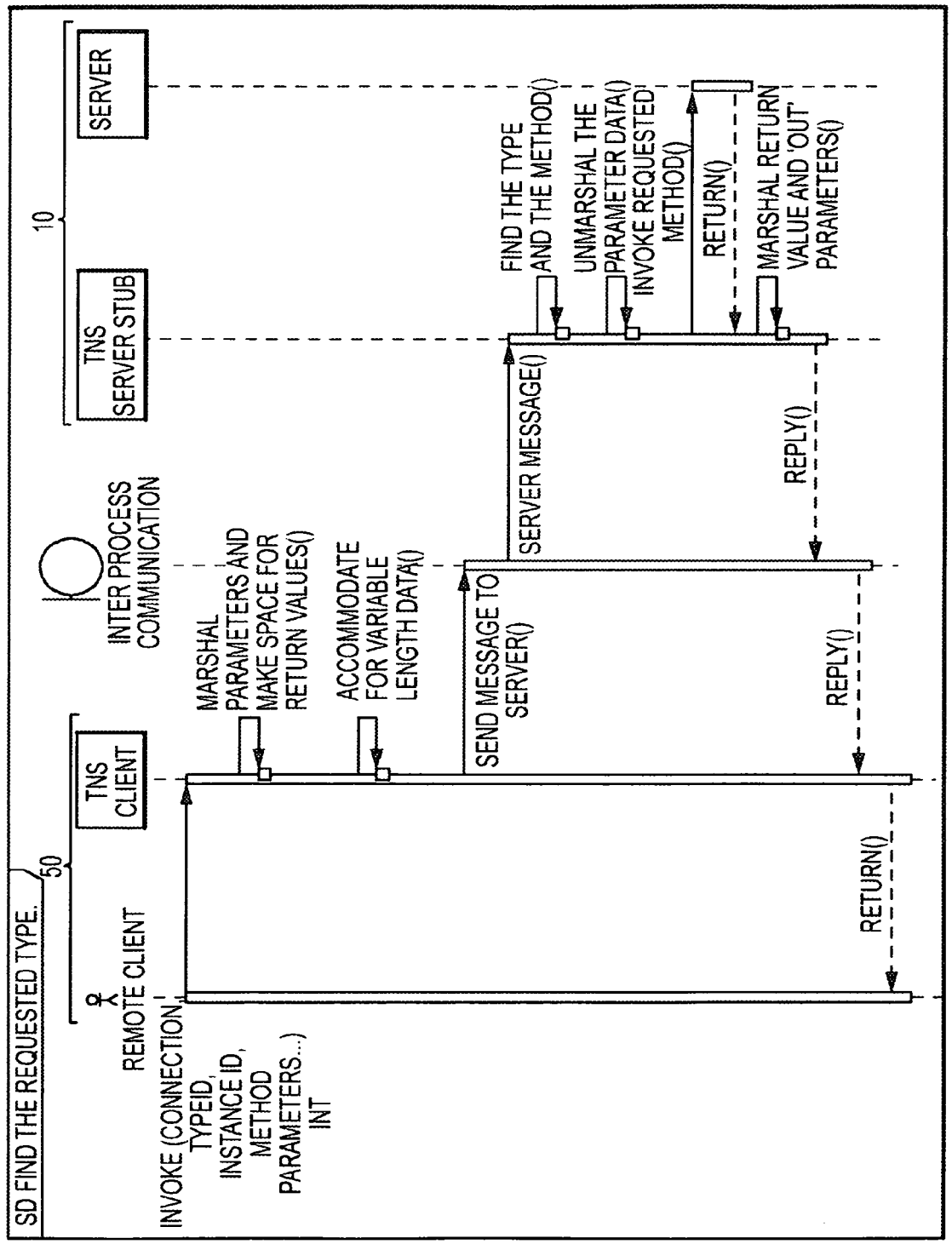
FIG. 9 is diagram illustrating in more detail the TNS client to TNS server function invocation process illustrated in FIG. 8.

Referring to FIGS. 8 and 9, to invoke a method on a server the following information is needed:

1. A connection to the server to which the call request will be made.
2. The type id of the class or structure type in which the context of the call is being made.
3. The instance id of the class that will receive the request
4. An array of vectors to the parameters and return values of the call.
5. Accommodation for variable length data To invoke a method the client sends a message to the server that includes the instance id of the class and the method id to be invoked. When the server receives a message it uses the type id to perform a lookup of the method/function prototype. It then decodes the incoming message based on the information found in the method/function prototype definition. The server decodes the instance ID and translates it into an instance of the object that owns the method being called. The server then extracts the data from the message and calls the method. When the message returns, the return data is packaged in the reply message and the server replies to the client.

Data Marshalling is the operation necessary to put data onto the wire. Data marshalling is automatic in TNS. In addition to supporting fixed size basic data types (characters, 16, 32, 64 and 128 bit integers, floating point variables, etc), it also supports variable data sized data (character strings and data blobs).

During the metadata and reflection gathering process of the compiler and the startup initialization, variable length data structures are detected. They come in two types; NULL terminated strings and data blobs. Data blobs have to be associated with a member or parameter that will specify the length or maximum length that can be accommodated.

Strings do not need a member or parameter that specify the length if it is an input parameter. If a string is going to be an output parameter, a length is necessary. The length is specified by naming the length parameter or member the same name as the parameter or symbol of the string or data blob with a suffix of 'len' added to the symbol or parameter name.

For example (in C++):

```
class foo
{
    char    *foo_name;
    int     foo_namelen;
};
```

In the above example, TNS will consider foo_namelen to contain the maximum number of characters that can be placed in foo_name.

Int dosomething(char *devicename, int param2, int param3, int devicenamelen);

In the above example, the method dosomething( ) has a parameter that will contain some variable length data (either a string or data blob). The last parameter will be interpreted by TNS to specify the maximum length of devicename.

Figure 10:
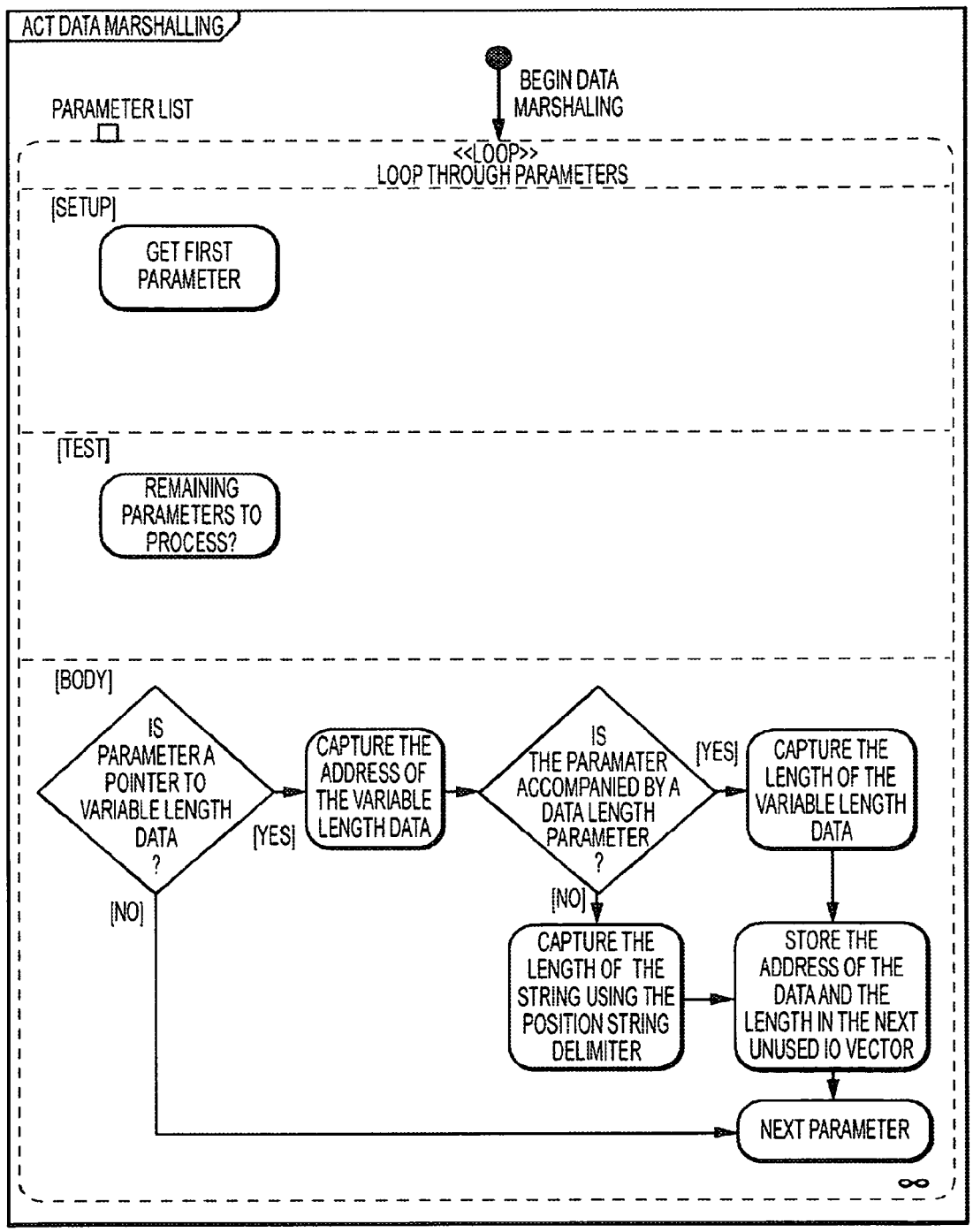
FIG. 10 is a diagram illustrating the data marshalling process.

With reference to FIG. 10, the data marshaller takes into account the data length parameter or symbol when arranging data so that it can be sent out in a message. When a call is made to the server, the client marshals the data. Marshalling involves locating the memory locations of the data and storing those locations and lengths into an array that is then used to write the data to the outgoing message stream. This allows generic access to the data locations without having to copy memory.

The first step of this process is to directly capture the parameters and the addresses of these parameters into an array. This orders the parameters and avoids needless memory copies. Each parameter is recorded into this array (called an "io vector"). Once this has occurred, then the system iterates through each parameter, and the ones that represent variable length data are then processed so that their length can be obtained and added to this io-vector. An io-vector for sending data and an io-vector for the reception of reply or response data are both created. The variable length data and parameters that are pointers or references are stored on this reply io-vector.

After a call has been made (a message sent to the server), the reply data may contain changes to the reference and variable length data. However, the pointer values in the parameters will be invalid, and have to be restored to the memory locations as known by the client. This restitution of correct data pointers occurs after the call.

The client and the server resolve variable length data pointers in different ways. The client has to specify a buffer with the correct length of the data to be returned before making the remote call. The server, on the other hand, knows how much data is transferred at the time of message reception.

If a client makes a remote call and does not provide enough room for the response, the call is made on the server but the server will return an error indicating that the reply buffer is insufficient in length to store the reply. For variable length data, the required length is returned in the corresponding data length parameter. The client can then adjust the length of the buffer and make the call again.

When data is returned, the client uses hints returned by the server to know where the variable length data is located in the reply buffer. Hints include null terminated data and fixed sized data that indicate data lengths. Those hints are used to update the references or pointers in the parameter list. Once the update occurs, the data can be accessed without being copied from the reply buffer.

The server, on the other hand, does not need to pre allocate a buffer to read variable length data. It can grow its buffer and read the data after the message is received. It operates similarly to the client by using hints to understand where variable length data begins and ends. The hints used by the server are the same as for clients. Those hints are used to populate the references and pointers with values that directly reference the buffer used to receive the data.

Cross Network Communication

TNS Clients and Servers seamlessly use the network communication mechanism provided by the operating system platform. In this way clients and servers do not have to be located on the same physical computer. TNS does not need a network protocol to handle the information exchanged between them if this is not desired. TNS can use any level of communication, from high level to 'on the wire' transactions.

When a server starts and after it has initialized, it makes itself available for clients to find it and connect to it. This can be done in numerous ways that are well known in the art. When the client starts it can be given a hint as to how to contact the server or it can be designed to scan for the server. Again, this can be implemented in numerous ways that are well known in the art and is no specific implementation is required for TNS.

TNS based servers keep track of the clients that have connected to it. This allows the implementer to enforce access permissions and allow the server to ignore requests from unauthorized clients. Additionally, encryption schemes can be implemented to encrypt the data in the call. Keeping track of clients allows TNS to optionally associate instances of classes with specific clients. This prevents clients from accessing and manipulating class instances owned by other clients. When a client disconnects, the TNS server can optionally clean up the instances that it has created on behalf of the client.

Figure 11:
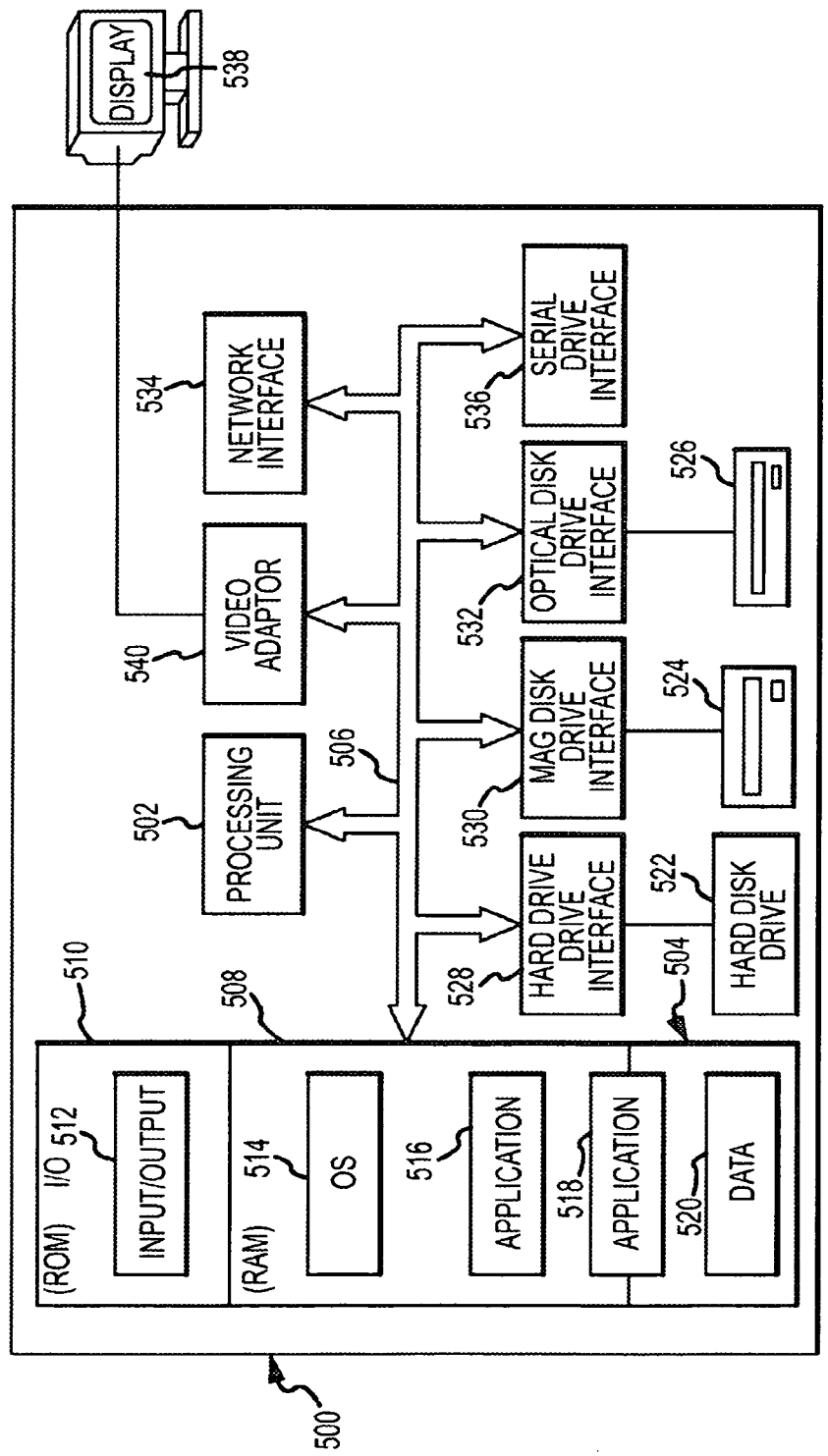
FIG. 11 is a functional block diagram of an exemplary workstation consistent with the technology of the present application.

Referring now to FIG. 11, a functional block diagram of a typical workstation 500 for the technology of the present application is provided. Workstation 500 may be any of the above described engines, workstations, servers, or the like. The workstation 500 is shown as a single, contained unit, such as, for example, a desktop, laptop, tablet, handheld, smart phone, personal digital assistant, or mobile processor, but the workstation 500 may comprise portions that are remote and connectable via a network connection such as via a LAN, a WAN, a WLAN, a WiFi Network, Internet, or the like. Generally, the workstation 500 includes a processor 502, a system memory 504, and a system bus 506. The system bus 506, which may follow any conventional protocol such as, for example, PCI or PCI-express, couples the various system components and allows data and control signals to be exchanged between the components. The system memory 504 generally comprises both a random access memory (RAM) 508 and a read only memory (ROM) 510. The ROM 510 generally stores a basic operating information system such as a basic input/output system (BIOS) 512. The RAM 508 often contains the basic operating system (OS) 514, application software 516 and 518, and data 520. The system memory 504 contains the code for executing the functions and processing the data as described herein to allow the present technology of the present application to function as described. The workstation 500 generally includes one or more of a hard disk drive 522 (which also includes flash drives, solid state drives, etc. as well as other volatile and non-volatile memory configurations), a magnetic disk drive 524, or an optical disk drive 526. The drives are connected to the bus 506 via a hard disk drive interface 528, a magnetic disk drive interface 530 and an optical disk drive interface 532. Application modules and data may be stored on a disk, such as, for example, a hard disk installed in the hard disk drive (not shown). The workstation 500 has network connection 534 to connect to a local area network (LAN), a wireless network, an Ethernet, the Internet, or the like, as well as one or more serial port interfaces 536 to connect to peripherals, such as a mouse, keyboard, microphone, touch screen, light pen, modem, or printer. The workstation 500 also may have USB ports or wireless components not shown. Workstation 500 typically has a display or monitor 538 connected to bus 506 through an appropriate interface, such as a video adapter 540. Monitor 538 may be used as an input mechanism using a touch screen, a light pen, or the like. On reading this disclosure, those of skill in the art will recognize that many of the components discussed as separate units may be combined into one unit and an individual unit may be split into several different units. Further, the various functions could be contained in one personal computer or spread over several networked personal computers. The identified components may be upgraded and replaced as associated technology improves and advances are made in computing technology.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. The above identified components and modules may be superseded by new technologies as advancements to computer technology continue.

The various illustrative logical blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Accordingly, the TNS system has been described with some degree of particularity directed to the exemplary embodiments. It should be appreciated, though, that the present invention is defined by the following claims construed in light of the prior art so that modifications or changes may be made to the exemplary embodiments without departing from the inventive concepts contained herein.

What is claimed is:

1. A system having machine code stored thereon, comprising:
   A. at least one server module including server machine code stored in a non-transitory machine readable storage medium operative to:
      i. provide a selected functionality; and
      ii. write information necessary to describe said selected functionality to a memory device;
      iii. use said information for creating dynamic function calls; and
   B. at least one client module including client machine code operative to:
      i. search said memory device for said selected functionality;
      ii. request at least a portion of said information; and
      iii. invoke said selected functionality of said server module;
   wherein said server machine code is generated by a compiler from server source code, said server source code including:
   source code for generating said server machine code operative to provide said selected functionality;
   source code for generating server machine code representative of said information; and
   source code for generating server machine code operative to write said machine code representative of said information to said memory device.

2. A system according to claim 1, wherein said compiler includes a preprocessor and at least a portion of said server source code is created by said pre-processor.

3. A system according to claim 2, wherein said preprocessor uses source code in the form of a macro to create said at least a portion of said server source code.

4. A system according to claim 3, wherein at least a portion of said server source code is created by said compiler.

5. A system according to claim 1, wherein at least a portion of said server source code is created by said compiler.

6. A system according to claim 1, wherein said functionality is selected from the group consisting of moving an actuator, performing a mathematical operation, receiving data from a sensor, and combinations thereof.

7. A system according to claim 1, wherein said server module writes said information necessary to describe said selected functionality to said memory device upon execution.

8. A system according to claim 1, wherein said information includes information necessary to invoke said selected functionality.

9. A system according to claim 8, wherein said information necessary to invoke said selected functionality includes types, members, and parameters.

10. A system according to claim 8, wherein said client module includes interface query functionality including client machine code operative to:
    retrieving said types;
    retrieving all of said members for each said type; and
    retrieving all of said parameters for each said member.

11. A system according to claim 10, wherein said client module includes data marshalling functionality including client machine code operative to:
    determine if said parameters are variable in length; and
    capture the length of parameters that are determined to be variable in length.

12. A system according to claim 11, wherein said parameter is accompanied by a data length parameter and said client module includes client machine code operative to store an address of said parameter and said data length parameter in an input output vector.

\* \* \* \* \*